United States Patent [19]

Kern et al.

[11] 4,451,955
[45] Jun. 5, 1984

[54] CRIMP-TYPE CLAMP

[75] Inventors: Peter W. Kern, Glendale; James J. Richter, Jackson Heights, both of N.Y.

[73] Assignee: Parker-Hannifin Corporation, Cleveland, Ohio

[21] Appl. No.: 535,540

[22] Filed: Sep. 23, 1983

Related U.S. Application Data

[63] Continuation of Ser. No. 379,596, May 19, 1982, abandoned.

[51] Int. Cl.³ .............................................. B65D 63/02
[52] U.S. Cl. .............................. 24/20 CW; 24/20 EE
[58] Field of Search .......... 24/20 CW, 20 W, 23 EE, 24/23 W, 20 EE

[56] References Cited

U.S. PATENT DOCUMENTS

| 9,041 | 1/1880 | Earle | 112/181 |
|---|---|---|---|
| 232,704 | 9/1880 | Gifford | 24/20 EE |
| 548,483 | 10/1895 | Vogel | 24/20 EE |
| 995,691 | 6/1911 | Latham | 24/20 EE |
| 2,163,048 | 6/1939 | McKee | 24/23 W |
| 2,760,262 | 8/1956 | Homan | 24/20 W |
| 3,020,631 | 2/1962 | Kennedy | 29/417 |
| 3,066,903 | 12/1962 | Tinnerman | 24/23 EE |
| 3,082,498 | 3/1963 | Oetiker | 24/20 R |
| 3,087,221 | 4/1963 | Armstrong | 24/20 CW |
| 3,106,757 | 10/1963 | Thurston et al. | 24/20 CW |
| 3,235,925 | 2/1966 | Gerhardt et al. | 24/23 EE |
| 3,286,314 | 11/1966 | Oetiker | 24/20 R |
| 3,295,176 | 1/1967 | Bright | 24/20 R |
| 3,402,436 | 9/1968 | Oetiker | 24/20 R |
| 3,523,337 | 8/1970 | Oetiker | 24/20 CW |
| 3,602,954 | 9/1971 | Gierlach | 24/20 CW |
| 4,222,155 | 9/1980 | Oetiker | 24/20 R |

Primary Examiner—Paul J. Hirsch
Attorney, Agent, or Firm—Frederick L. Tolhurst

[57] ABSTRACT

A crimp-type hose clamp wherein the ends of the clamp are joined in a double-layered top portion of the hat section of the clamp.

8 Claims, 9 Drawing Figures

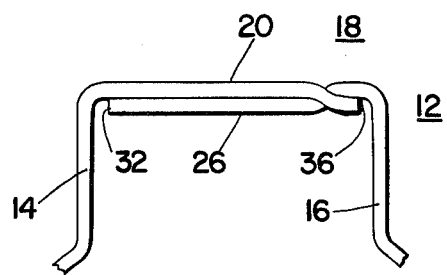
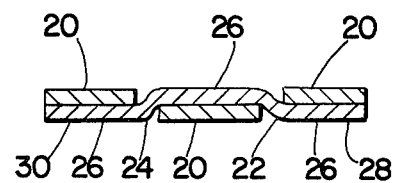
Fig. 2    Fig. 3
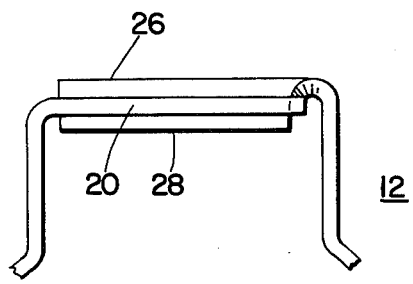
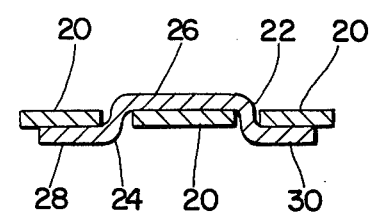
Fig. 5    Fig. 6
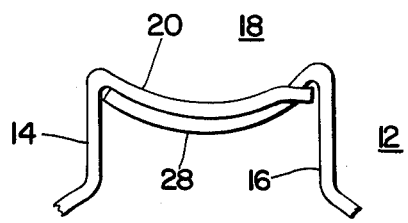
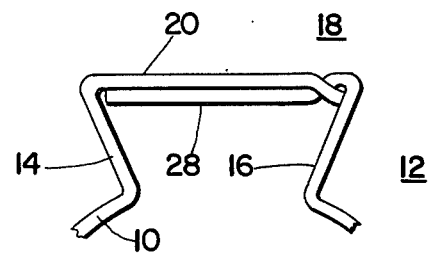
Fig. 7    Fig. 8
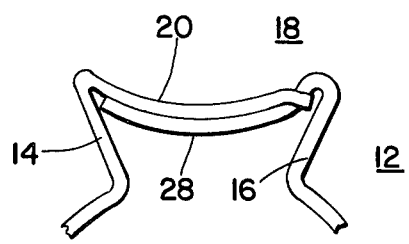
Fig. 9

CRIMP-TYPE CLAMP

This is a continuation of application Ser. No. 379,596, filed May 19, 1982, now abandoned.

BACKGROUND OF THE INVENTION

1. Field of the Invention

The subject invention is directed to hose clamps and, more particularly, hose clamps that are secured by means of a crimping device.

2. Description of the Prior Art

For may years, clamps and bands have been made for a broad range of purposes. Many types and styles of such clamps have been developed with particular regard to securing flexible hose. Examples are shown in U.S. Pat. Nos. Re. 9,041 and U.S. Pat. No. 2,163,048. Among these types are crimp-type clamps which are secured to the hose by crimping an extended portion or "hat" of the clamp with a crimping tool. Examples of such clamps are shown in U.S. Pat. Nos. 4,222,155; 3,295,176; 3,286,314; 3,082,498; 3,602,954; 3,020,631; Re. 25,769; 3,523,337; and 3,402,436.

Crimp-type clamps are best suited for light duty applications that do not require the performance afforded by more elaborate types of clamps such as screw-type clamps. Some types of crimp-type clamps developed in the prior art are relatively complex and, therefore, somewhat difficult and expensive to manufacture. Generally, to limit manufacturing costs, crimp-type clamps are usually formed from a strip of flat stock with the ends of the stock being welded or mechanically coupled in an overlapped arrangement at some point along the sealing surface. However, such arrangements incorporate discontinuities in the sealing surface and provide irregular and low sealing pressure along the sealing surface at a location remote from the crimped portion. Thus, such prior art clamps establish a potential for fluid leakage within a zone of the sealing surface that is remote from the crimped portion. Accordingly, there was a need for a crimp-type sealing clamp that avoided such low-pressure zones along the sealing surface where there was a higher potential for leakage.

Prior art crimp-type clamps also had a zone of relatively low sealing pressure adjacent the ends of the sealing surface that were connected to the hat portion. This zone of low pressure was due to the relatively weak tangential force applied to the ends of the sealing surface by the crimped extended portion. In attempting to overcome this problem, a special crimping tool was developed that would support the top portion of the crimping section so that the top portion would not buckle during the crimping process. However, the crimp-type clamps requiring this special type of crimping tool could not be used with the standard crimping tool. This required users of crimp-type clamps to have both types of crimping tools or, alternatively, to limit themselves to the use of only one type of clamp. Preferably, therefore, the crimp-type clamp having the continuous sealing surface between the hat portion should be compatible with either type of crimping tool.

SUMMARY OF THE INVENTION

In accordance with the subject invention, a crimp-type hose clamp provides a continuous seal between the ends of a hat section. To provide the continuous sealing surface, the ends of the strip that forms the clamp are connected to form the top portion of the hat section. Preferably, the ends of the strip are overlapped by and butted against each other such that they are compatible with either style of crimping tool. Also preferably, the ends are connected together by a cooperating tab and slot arrangement. Alternatively, they can be welded or fastened together with a suitable bonding agent.

Other details, objects and advantages of the invention will become apparent as the following description of a presently preferred embodiment thereof proceeds.

BRIEF DESCRIPTION OF THE DRAWINGS

The accompanying drawings show a presently preferred embodiment of the invention wherein:

FIG. 2 is a partial elevational view of the clamp shown in FIG. 1 taken along the lines II—II of FIG. 1.

FIG. 3 is a partial cross-sectional view of the clamp shown in FIG. 1 taken along the lines III—III in FIG. 1.

FIG. 5 is a partial elevational view of the assembled strip of FIG. 4 showing the hat portion in its assembled, unpressed state.

FIG. 6 is a partial cross-section of the assembled strip of FIG. 4 showing the hat portion in its assembled, unpressed state.

FIGS. 7, 8 and 9 are elevational views of the hat portions of three alternative embodiments of the clamp shown in FIGS. 1–3.

DESCRIPTION OF THE PREFERRED EMBODIMENT

Figure 1:
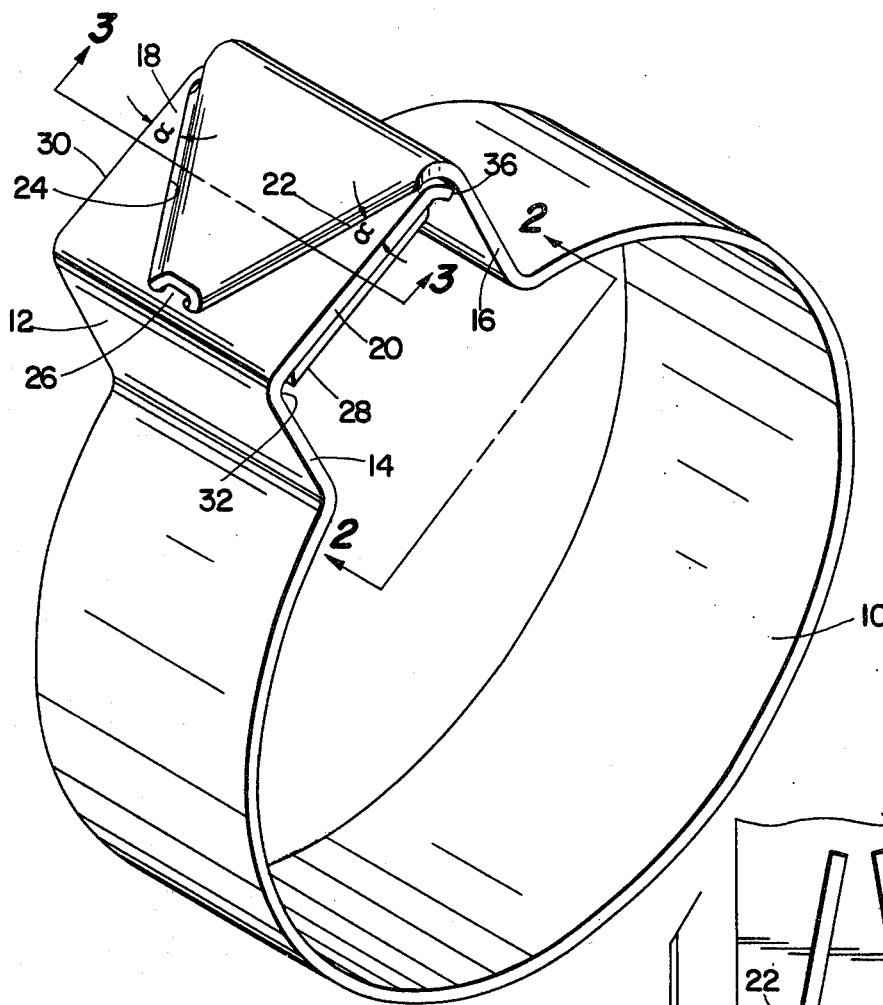
FIG. 1 is a perspective view of a hose clamp embodying the present invention.

FIGS. 1-14 3 show a hose clamp according to the subject invention wherein a metal strip is formed in a continuous c-shaped clamping surface 10 and the ends of the metal strip are interlocked in a double-layered hat section 12. Double-layered hat section 12 includes offset sections 14 and 16 that are connected to the ends of clamping surface 10. Also included in hat section 12 is a double-layered top section 18 having opposite ends connected to one of the offset sections 14 or 16.

As shown more particularly in FIGS. 2 and 3, double-layered top section 18 includes a first layer 20 provided with obliquely aligned slots 22 and 24, and a second layer 26 provided with tabs 28 and 30 located in registry with slots 22 and 24 and detented so that first and second layers 20 and 26 are interleaved in a double layer structure with tabs 28 and 30 interfacing with first layer 20 on one side and the remaining portion of layer 26 interfacing with first layer 20 on the opposite side.

To provide increased rigidity in the corners of hat section 12, first and second layers 20 and 26 are sized such that end portions 32 and 34 of tabs 28 and 30 are in contact with or closely adjacent the internal face of offset section 14 and the end portion 36 of layer 20 is in contact with or closely adjacent the face of offset section 16. The increased rigidity of the double-layered hat section 12 makes the presently disclosed crimp-type hose clamp compatible with any commonly available style of crimping tool.

The diagonal angle oc of slots 22 and 24 and tabs 28 and 30 in top section 18 is such that end portions 32 and 34 and end portion 36 extend over a substantial portion of the width of the clamp. Thus, during the crimping operation, end portions 32, 34 and 36 distribute the compression load of the crimping force over substantially the entire width of the clamp.

Figure 4:
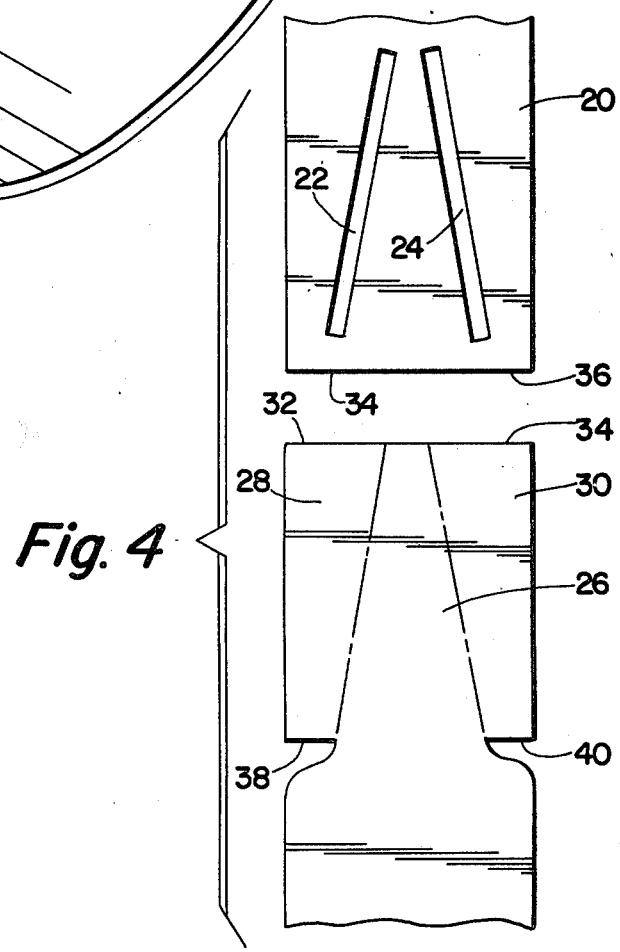
FIG. 4 is a plan view of the unassembled strip that forms the hose clamp herein disclosed.

The manufacture of the crimp-type clamp herein disclosed is explained with particular reference to FIGS. 4-6. Preferably, the clamp is cold-formed from a metal strip having shaped ends such as shown, for example, in FIG. 4. The first end of the metal strip of FIG. 4 is provided with obliquely arranged slots 22 and 24 at one end. The second end of the strip is provided with lateral cuts 38 and 40 that are recessed from ends 32 and 34 in correspondence with the distal ends of slots 22 and 24 from end 36. Preferably, the second end of the strip is joggled adjacent lateral cuts 38 and 40. The metal strip is then cold-formed to provide the continuous c-shaped sealing section 10 and the hat section 12. Specifically, the first and second ends of the strip are joined to form double-layered top section 18 of hat section 12 by bending the corner portions of the second end of the strip to form tabs 28 and 30 and inserting tabs 28 and 30 through slots 22 and 24 in the first end of the strip. The first and second ends of the strip are then detented by folding tabs 28 and 30 back against the first end of the strip to form a three-layered top section as shown in FIGS. 5 and 6. The three-layered top section is then placed in a press and compressed into two-layered top section 18 shown in FIGS. 1-3 wherein top section 18 has a thickness that is substantially equal to twice the thickness of the metal strip. In addition to the additional strength provided by the interleaved double-layer structure of top section 18, the cold forming processing technique provides double-layered top section 18 with additional metallurgical strength to resist buckling during the crimping operation.

FIGS. 7, 8 and 9 show alternative embodiments of the hat section of the crimp-type clamp herein disclosed. In FIG. 7, top section 18 is provided with a concave curvature such that the top section further resists buckling during the crimping operation. In the hat section shown in FIG. 8, offset sections 14 and 16 are located in non-parallel relation such that they converge toward each other adjacent the junctions between sections 14 and 16 clamping surface 10. It has been found that the arrangement shown in FIG. 8 wherein the respective ends of sections 14 and 16 adjacent clamping surface 10 are closer than the respective ends of sections 14 and 16 adjacent top section 18 also provides further resistance to buckling of top section 18 during crimping. FIG. 9 shows another embodiment of the disclosed hat section that incorporated both the advantages of the concave clamping surface shown in FIG. 7 and the advantages of the converging offset sections shown in FIG. 8.

While a presently preferred embodiment of the invention is shown and described, the invention is not limited thereto, but may be otherwise variously embodied within the scope of the following claims.

What is claimed is:

1. A hose clamp for gripping and securing hose, said hose clamp comprising:
    a continuous curvelinear band,
    first and second offset sections that are connected to opposite ends of said curvelinear band;
    a slotted top end connected to said first offset section, said slotted top end having an end portion that is located adjacent the internal face of said second offset section; and a mating top end connected to said second offset section, said mating top end having an end portion that is located adjacent the internal face of said first offset section, said mating top end having tabs that are in registry with the slots of said slotted top end, said mating top end being interleaved with said slotted top end to provide a double wall connection of the slotted top end with the mating top end.

2. A hose clamp comprising:
    a c-shaped sealing section that provides a seamless, continuous clamping surface between the ends thereof;
    first and second offset sections connected to the ends of said c-ring portion; and
    a double-layered top section connected to the opposite ends of said offset sections, said double-layered top section including one layer that has two oblique slots and an end portion that is located adjacent the internal face of said first offset section, said double-layered top section further including a second layer having tabs that extend through said slots and interleave with the first layer and end portions that are located adjacent the internal face of said second offset section.

3. A crimp-type hose clamp comprising:
    a sealing section that provides a continuous, seamless clamping surface between its extreme ends;
    first and second crimp sections that are connected to opposite ends of said sealing section; and
    a double-layered top section having a first layer that includes slots and that is connected at one end to said first crimp section and at the opposite end has an end portion that is located adjacent the internal face of said first crimp section, said double-layered top section further having a second layer that includes tabs and that is connected at one end to said second crimp section and at the opposite end has an end portion that is located adjacent the internal face of said second crimp section.

4. The crimp-type hose clamp of claim 3 wherein one side of the first layer is adjacent the tabs and the other side of the first layer is adjacent the remainder of the second layer.

5. The crimp-type hose clamp of claim 4 wherein said slots are obliquely arranged in said first layer.

6. A hose clamp having a continuous curvelinear band and a hat structure that is connected to opposite ends of said curvelinear band, said hat structure including:
    first and second side sections; and
    a top portion having first and second layers, said top portion bridging between said first and second side sections and located radially outwardly from said curvelinear band, said top portion having a slotted top end and a mating top end, said mating top end having locking tabs and said slotted top end having slots with the locking tabs extending therethrough, the slotted top end and mating top end being interleaved to each form portions of said first and second layers such that the top portion has an overall thickness substantially equal to the sum of the thickness of the first and second layers with the end portions of the tabs of the mating top end abutting one of the side sections and the end portion of the slotted top end abutting the other of the side sections.

7. The hose clamp of claim 6 wherein said slots are arranged so that the end portions of the tabs and the end portion of the slotted top portion extend over a substantial portion of the width of the curvelinear band.

8. The hose clamp of claim 7 wherein said slots are obliquely aligned.

* * * * *